United States Patent

Chowdhury et al.

[11] Patent Number: 6,032,191
[45] Date of Patent: Feb. 29, 2000

[54] DIRECT COUPLING FOR DATA TRANSFERS

[75] Inventors: Shyamal Chowdhury, Austin; Michael Norman Day, Round Rock; Damon Anton Permezel, Austin, all of Tex.; Lance Warren Russell, Hollister, Calif.

[73] Assignee: International Business Machines Corporation, Armonk, N.Y.

[21] Appl. No.: 08/958,823

[22] Filed: Oct. 28, 1997

[51] Int. Cl.[7] ................................................. G06F 13/00
[52] U.S. Cl. ........................................ 709/238; 709/220
[58] Field of Search .................................... 709/238, 220, 709/229, 226, 232

[56] References Cited

U.S. PATENT DOCUMENTS

| | | | |
|---|---|---|---|
| 4,993,030 | 2/1991 | Krakauer et al. | 371/40.1 |
| 5,522,041 | 5/1996 | Murakami et al. | 709/200 |
| 5,550,816 | 8/1996 | Hardwick et al. | 370/60 |
| 5,566,326 | 10/1996 | Hirsch et al. | 395/500 |
| 5,630,076 | 5/1997 | Saulpaugh et al. | 395/284 |
| 5,724,512 | 3/1998 | Winterbottom | 709/212 |
| 5,727,061 | 3/1998 | Johnson et al. | 380/25 |
| 5,905,911 | 5/1999 | Shimizu | 395/842 |

*Primary Examiner*—Zarni Maung
*Attorney, Agent, or Firm*—Robert V. Wilder; Leslie A. Van Leeuwen

[57] ABSTRACT

A method and implementing apparatus is provided for transferring data from a first device to a second device through a system coupling call. The coupling methodology is implemented to effect a direct coupling between a data producing device and a data receiving device such that data transfers between devices is passed more directly between devices with only minimal copying of the data during the transfer process. The coupling subsystem enables the construction of coupling modules which provide services and afford the opportunity to optimize the transference of data between two devices and permit the dynamic construction of coupling modules to provide coupling service between any pair of devices. In one example, video calls have been created to interface within the new data coupling environment.

24 Claims, 6 Drawing Sheets

DIRECT COUPLING FOR DATA TRANSFERS

RELATED APPLICATIONS

The present application is related to a co-pending application entitled "FILE TRANSFERS USING PLAYLISTS", U.S. application Ser. No. 08/958,824, filed on even date herewith and assigned to the assignee of the present application.

FIELD OF THE INVENTION

The present invention relates generally to information processing systems and more particularly to an improved method for more efficiently transferring data between devices.

BACKGROUND OF THE INVENTION

As computer network applications increase in capabilities and functionality, the speed of information transfer between system devices, or between a network server and system devices, becomes more and more important. Inefficiencies in information transfer systems are multiplied depending upon the complexity of the network and the number and complexity of the applications and devices being run on the system. The popularity and growth of multimedia computing in general, and especially in network multimedia computing, has increased the need to optimize information transfer efficiencies in order to improve system speed, especially with increased amounts of data and information being transferred between network devices.

Multimedia data and files are typically transferred between a server device and a client device intact. There is generally no need for the server application code to copy or modify the data being transferred. Current multimedia servers, however, copy the data in accomplishing data transfer transactions. This produces a severe performance problem in the entire network. For example, with the UNIX read/write processed-based I/O model, a response to a READ system call, moves the requested data from a device into network server kernel buffers, and then copies the data into designated user memory space. The user process is then dispatched to, and issues a WRITE system call, resulting in the data being copied back from user space to kernel buffers, and then out again to the device. Thus data is caused to cross the I/O bus twice, and there must be a dispatch to a process for each block of data.

Thus there is a need for an improved method and processing apparatus which is effective to increase the efficiency of network information transfers and implement a processing subsystem effective to avoid unnecessary copying of data in data transfer transactions.

SUMMARY OF THE INVENTION

A method and implementing apparatus is provided for transferring data from a first device to a second device through a system coupling call. The coupling methodology is implemented to effect a direct coupling between a data producing device and a data receiving device. The coupling subsystem also enables the construction of coupling modules which provide services to optimize the transfer of data between two devices. A framework and a general I/O device interface are utilized to permit the dynamic construction of coupling modules to provide coupling service between any pair of devices. In one exemplary embodiment, video system calls are created to respond to video-related requests in the coupling subsystem environment.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
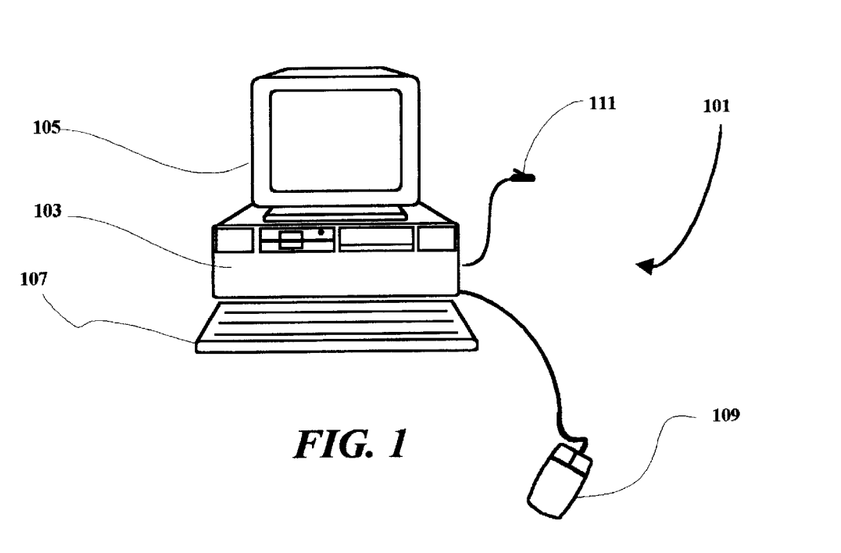
FIG. 1 is an illustration of an exemplary computer system terminal.

With reference to FIG. 1, the various methods discussed herein may be implemented within a typical computer system 101 which may include a workstation or personal computer. In general, an implementing computer system may be a single system or workstation, which may include a plurality of processors in a multi-bus system, or the disclosed methodology may be implemented in a network of similar systems. However, since the workstation or computer system or network within which the present invention may be implemented is, for the most part, generally known in the art and composed of electronic components and circuits which are also generally known to those skilled in the art, circuit details beyond those shown in FIG. 1 and FIG. 2 will not be explained to any greater extent than that considered necessary as illustrated, for the understanding and appreciation of the underlying concepts of the present invention and in order not to obfuscate or distract from the teachings of the present invention. The present invention may also be implemented on server only systems which may not include a monitor unit, keyboard or mouse, but for purposes of explaining the present invention, a typical user terminal system including monitor, keyboard and mouse is illustrated.

In FIG. 1, the computer system includes a processor unit 103 which is typically arranged for housing a processor circuit along with other component devices and subsystems of the computer system 101. The computer system 101 also includes a monitor unit 105, a keyboard 107 and a mouse or pointing device 109, which are all interconnected with the computer system illustrated. Also shown is a connector 111 which is arranged for connecting a modem within the computer system to a communication line such as a telephone line in the present example. The terminal illustrated in FIG. 1 may also be arranged to be hard-wired within a network configuration. The present invention may also be implemented in a wireless or cellular system.

Figure 2:
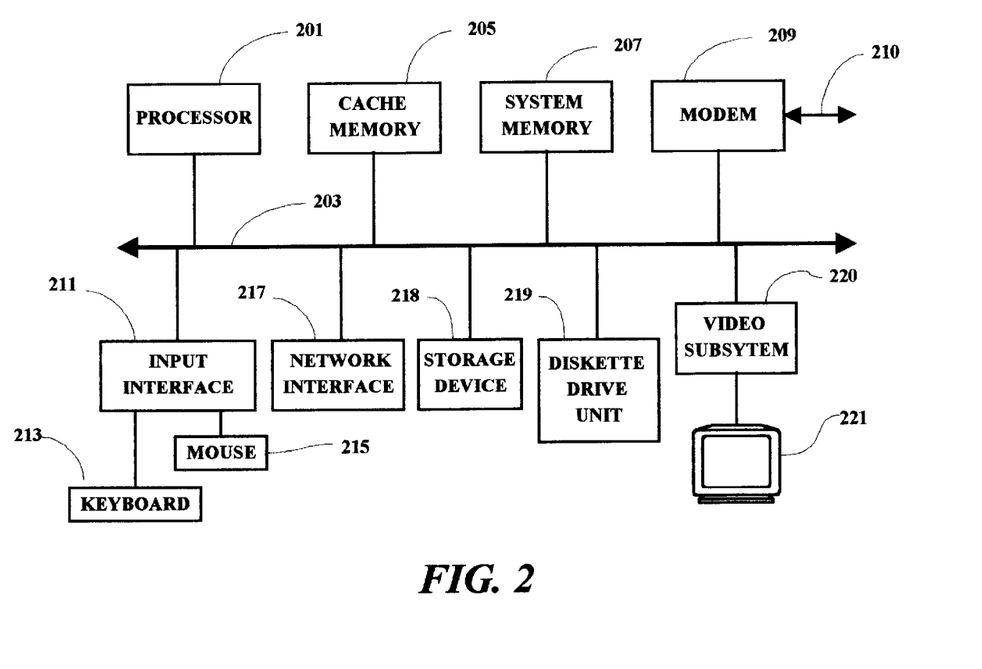
FIG. 2 is a simplified schematic diagram including several of the major components of the system illustrated in FIG. 1.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 21S. The bus 203 is also coupled to a network interface subsystem 217 and a diskette drive unit 219. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. In network configurations, application programs are typically stored in system memory and available for access by all terminals which may be connected within the computer system. Such program signals are selectively effective to cause the computer system terminals to present displays on the screen of a display device and respond to user inputs in accordance with the functional flow of the application program.

Figure 3:
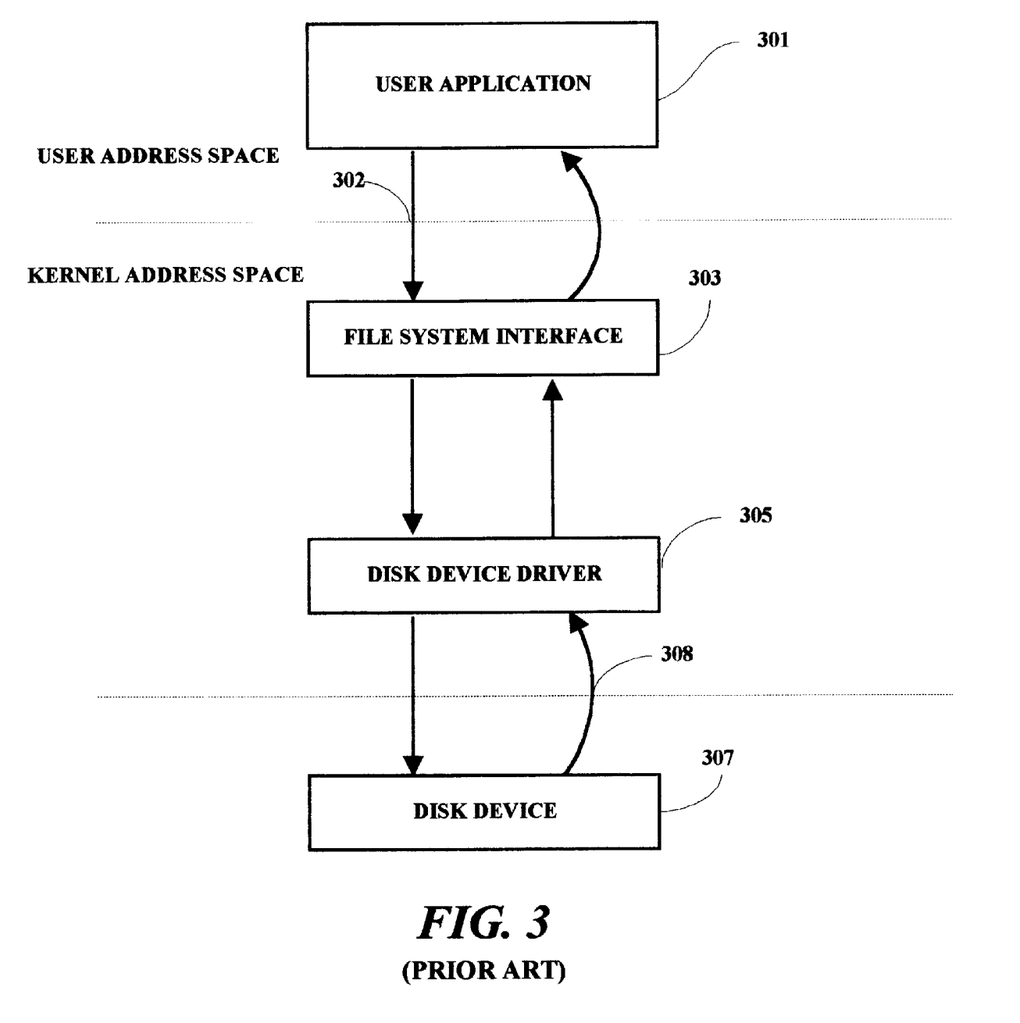
FIG. 3 illustrates a prior art processing flow in moving data from one computer input device to another computer output device.

In traditional computer operating systems, such as UNIX, DOS, WINDOWS etc., the input/output interfaces are based upon copy semantics. Read and Write calls transfer or copy data between the operating system and user-defined buffers. That copying of data is a major inhibitor to performance, and the less copying that is done, the better will be the relative performance of the system. When a user-level application desires to move data from one computer (input) device to another computer (output) device, the steps illustrated in FIG. 3 and FIG. 4 would occur. The term "device" is herein used in a generic sense, and could actually include a complex combination of hardware and software, such as a filesystem or a protocol stack. The illustration uses an example in which data will be moved from a disk file to the network. A user application 301 would first allocate local buffer space. The user-level application 301 would then call 302 the operating system's file system software 303, requesting that the data be transferred from the file to the local buffer, i.e. a Read call. The operating system would then call the disk device driver 305 requesting that the requested data be copied from the physical device 307, which is part of the Read call. The device driver 305 then allocates operating system buffers and copies the data 308 into the buffers. That function is also part of the Read call. Finally, the file system software copies the data to the user level buffers 301 which were initially allocated in the first step of the process, and that function ends the Read call.

Figure 4:
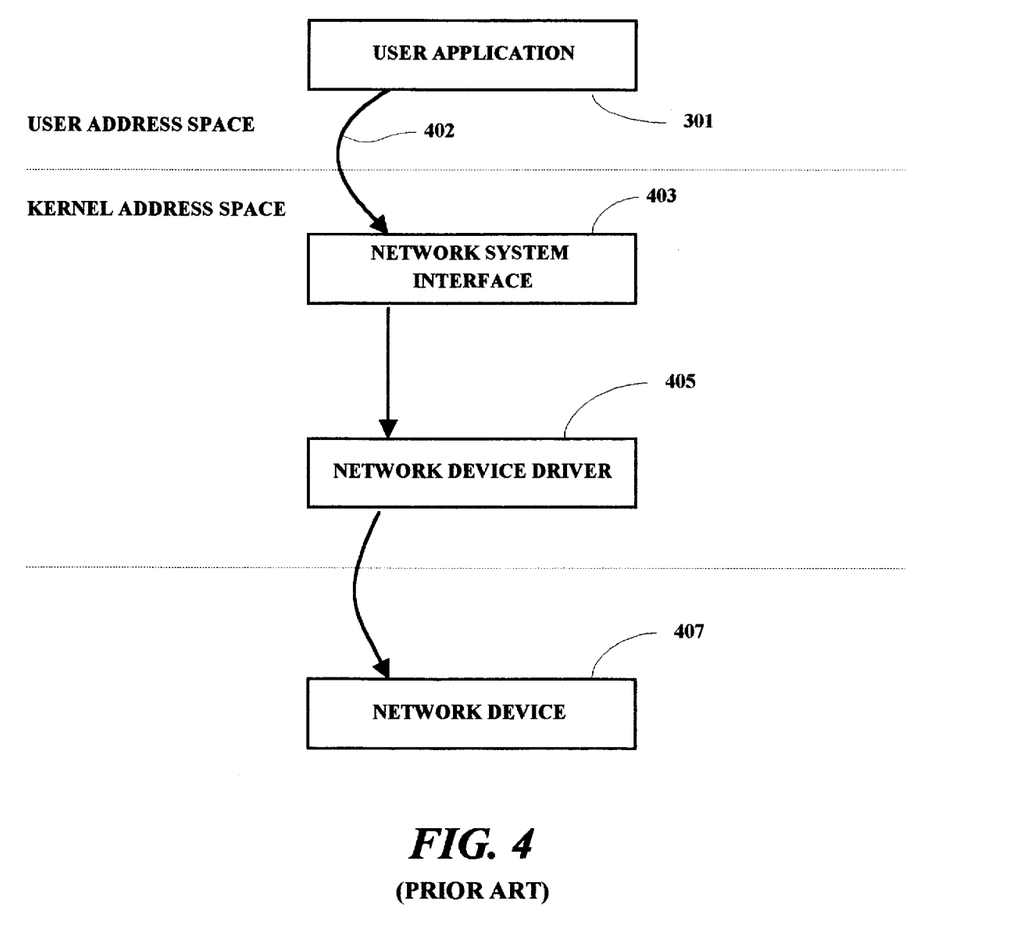
FIG. 4 is another illustration of a prior art processing flow.

As illustrated in FIG. 4, the user level application 301 then writes 402 the contents of the buffer to the output device, which is the network 403 in the present example. This step is the first step in a Write call. The network operating system code then copies the contents of the user buffer into a network operating system buffer and the network system call then passes the buffer to the device driver 405 for the network adaptor. The Write call then ends when the network device driver then copies the contents of the operating system buffer to the network device 407. From the foregoing description, it is apparent that the amount of copying functionality in the "Read/Write" semantic data transfer process is substantial.

Figure 5:
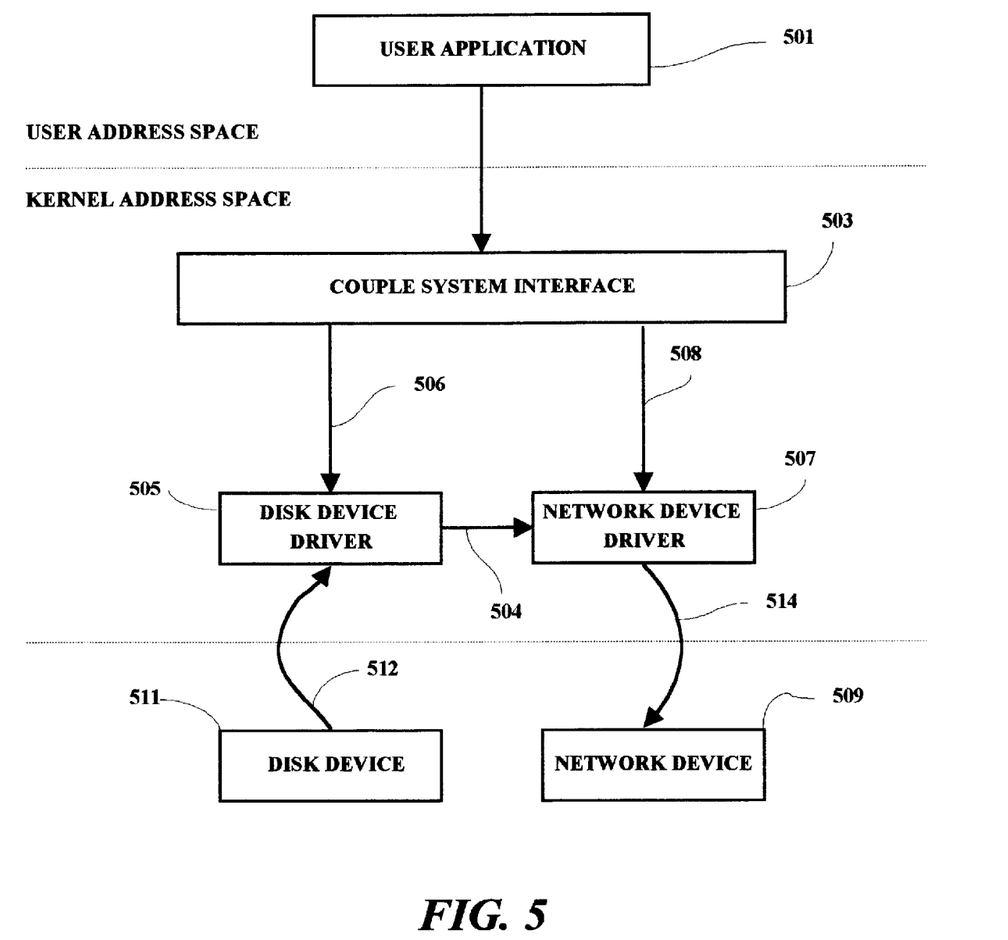
FIG. 5 is a diagrammatic illustration of a data transfer transaction in which the methodology of the present invention is implemented.

An exemplary data transfer methodology, in accordance with the present invention, is illustrated in the diagram of FIG. 5. As illustrated, the user input/output interface is not based upon the copy semantics of Read/Write, but rather on the semantics of coupling two devices together and starting data transfer. Data then flows directly between the coupled devices without being copied to or from the user buffers. When a user application desires to move data from one computer (input) device to another computer (output) device, the following steps shown in FIG. 5 would occur in the illustrated example. The example illustrated is a data transfer from a disk file to a network. Initially, the user application 501 "couples" the disk and network device together using a new coupling interface 503. The user level application 501 then starts the data flow 506, 508, using the new coupling interface 503. At that point, data is copied 512 from the physical disk 511 into an operating system buffer. The operating system buffer data is passed 504, not copied, to the network device driver 507, which then writes the data 514 to the network device 509.

Figure 6:
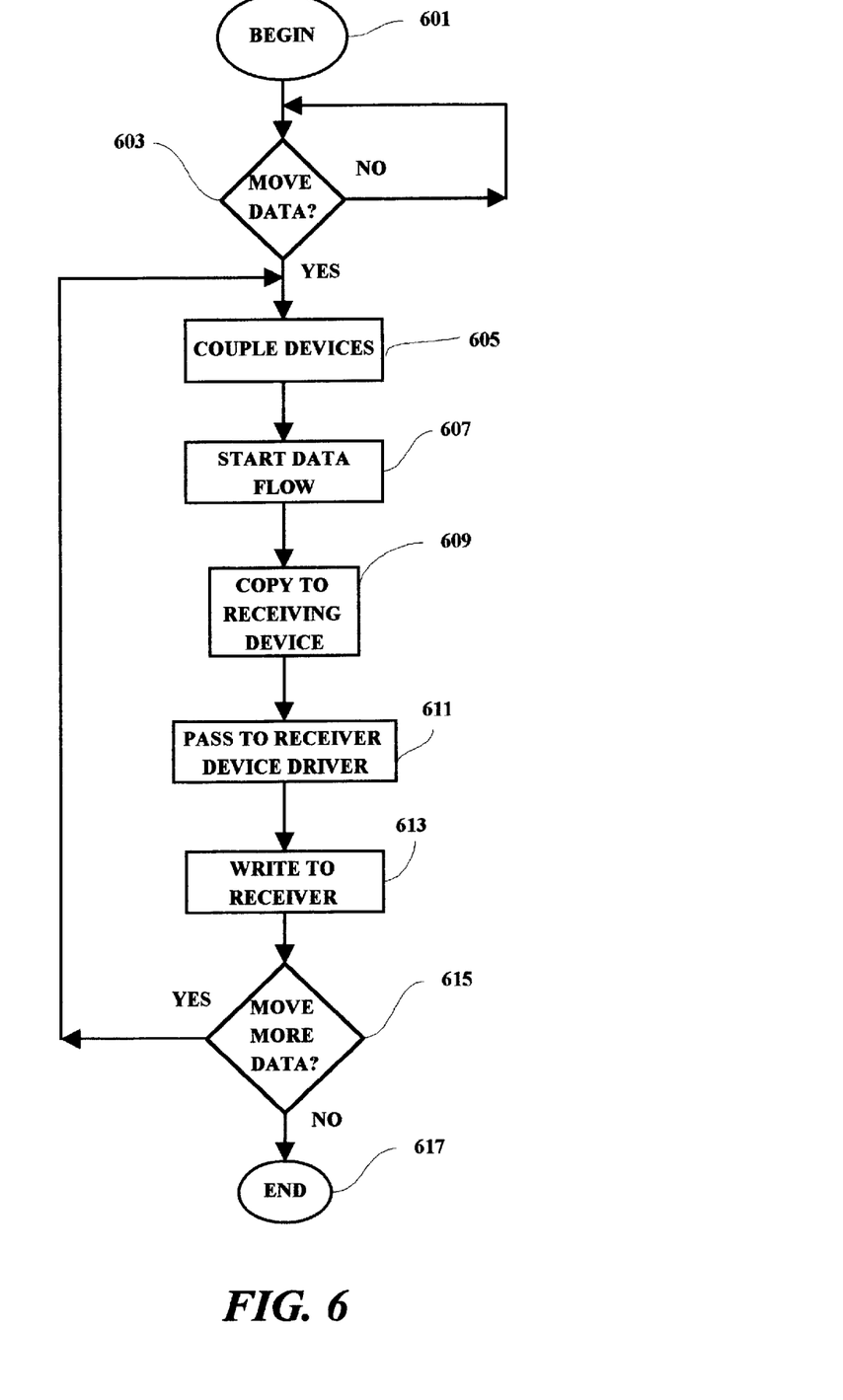
FIG. 6 is a flow chart illustrating the methodology flow as implemented in a preferred embodiment of the present invention.

The methodology flow of the data transfer process disclosed herein is illustrated in flow chart form in FIG. 6. Using the present methodology, data is not copied, i.e. read from and written to sequential devices and across data paths as the data is transferred from one device to another, but rather, sending and receiving devices are identified and the data flow is direct and concurrent as data is passed from the sending device to the receiving device along the most direct route available. As the process begins 601 and a determination is made to move data 603, the data originating device and the data receiving device are identified and linked together or coupled 605. Next, the Start Data Flow process is initiated 607 and data is copied to the receiving device 609, 512. The data is then passed 611, 504 to the data receiver device driver 507 and written 613, 514 to the data receiving device 509. It is here noted that the disclosed methodology entirely eliminates the need to copy data to or from the user application buffers. Instead, devices are coupled together, a service module is created, and then data flows directly between the devices between which the data transfer is to take place. This elimination of the copying to and from the user buffers substantially reduces the data flow path length and the time required to complete the data transfer transaction and an order of magnitude increase in performance. At that point, the process may be repeated if more data is to be transferred, or else the process will end 617. Thus, in transferring data from one device to another, two file descriptors are coupled together in a manner such that the data is read from one and written to the other in a more efficient manner, thereby increasing system capacity for servicing continuous media streams of data.

Figure 7:
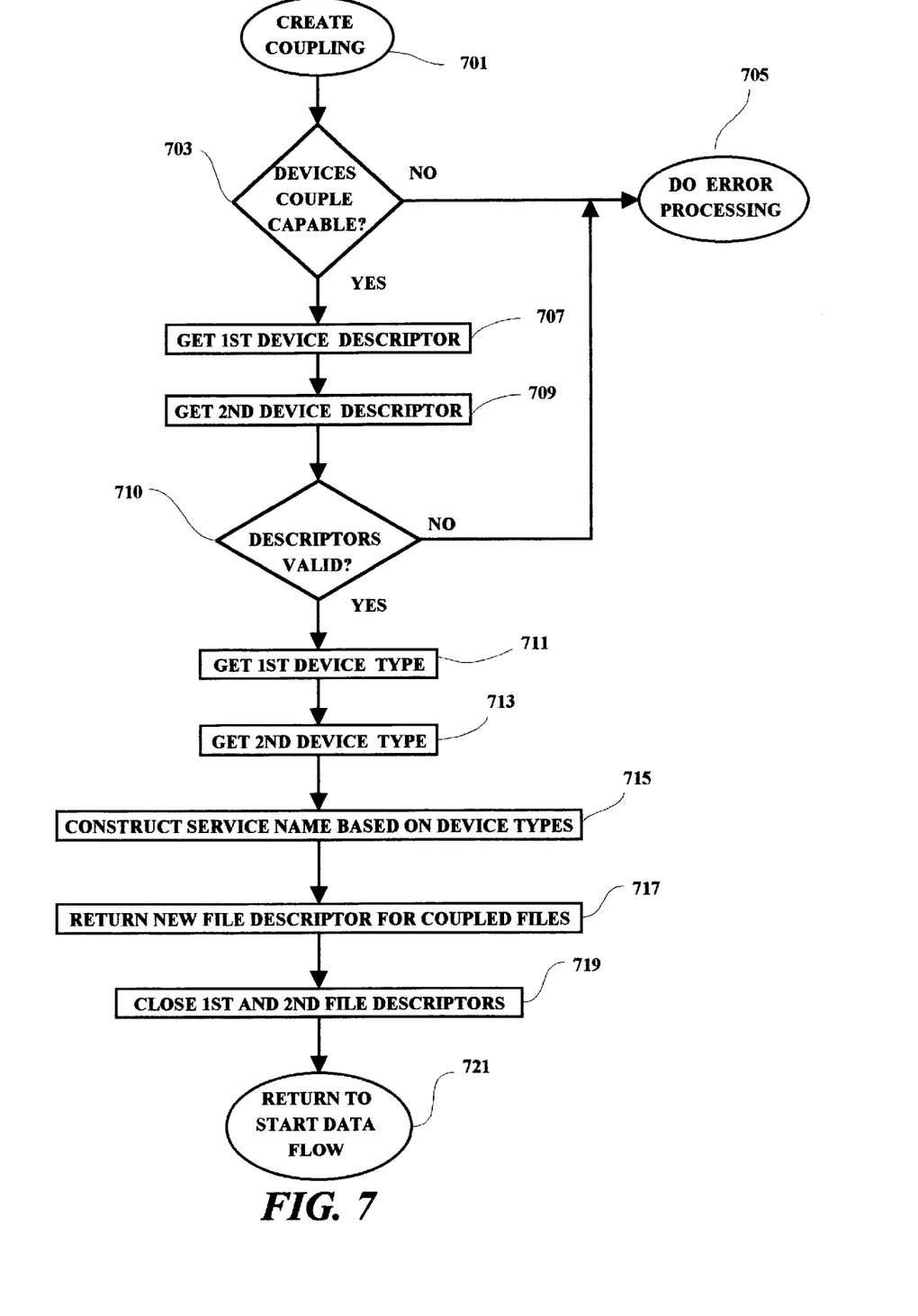
FIG. 7 is a flow chart illustrating the methodology flow of the coupling step of FIG. 6.

The "couple devices" step 605 of FIG. 6 is detailed in FIG. 7. In order to create a coupling 701, the application must have the descriptors for the two files representing two devices being coupled. As hereinbefore noted, the term "device" is used in the generic sense and could actually be a complex combination of hardware and software, such as a filesystem or protocol stack. A determination is made as to whether the two devices are couple capable 703. If not, appropriate error processing steps are taken 705. If the devices are couple capable 703, the program gets the first device descriptor 707 and also the second device descriptor 709. The descriptors are checked for validity 710 and if one or both of the descriptors are invalid, appropriate error processing steps are implemented 705. If the descriptors are valid 710, the program gets the first device type 711 and also gets the second device type 713. The application must also know the type of the two devices, and construct a service name based on the two types 715. For example, if the application wanted to couple a multi-media file system (mmfs) device with a device for the atm (asynchronous transfer mode) network, the service name would be: "mmfs/atm". Service names for particular devices are well known and published in the documentation written for the application developer. The system call is "ct1=couple (int fd1, int fd2, char *const service)", where "fd1" is the read-side file descriptor, "fd2" is the write side file descriptor, and "service" is the name of the desired service. On successful execution, a new file descriptor is returned 717 and file descriptors "fd1" and "fd2" will be closed 719. The files will remain open but no longer accessible as "fd1" or "fd2". The process then returns to the "START DATA FLOW" step 607, and the process continues as hereinbefore explained in connection with FIG. 6. The application starts data flowing through an "ioctl" call.

In multimedia applications, additional control functions have been created to be compatible with the new "couple" data transfer methodology such that the video control subsystem is able to control the flow of data to the user. The new controls include video functions such as pause, seek, queuing of videos and jump, among others, so that users have the benefit of the increased speed of the "couple" methodology as well as the convenience of the typical user controlled video functions. If such functions were not supported by the couple subsystem, then the performance gain from the couple transfer could not be realized since users would be required to view a video from beginning to end without interruption for pause or fast forward etc. Accordingly a series of I/O controls has been added to permit the application to direct the data flow. The application accomplished this through an ioctl system call on the "couple" file descriptor.

For example, to pause the data stream, the application would issue an ioctl (cd_couple_d, CTL_PAUSE, &cd_pause), where cd_couple_d is the file descriptor returned from the couple system call and cd_pause is a structure that tells the system (among other things) the byte offset in the data stream at which to pause. The application may wish, for example, to pause 100 MBytes into the data stream, and then ask the user if the user wants to continue such as what would occur when a program wishes to ask a user if the user wants to view a movie after seeing a preview of the movie. When performing a read/write data transfer as distinguished from a "couple" transfer, the application would simply count the number of bytes it had written to the output device, and pause at the desired location. With the "couple" methodology, the application would issue an ioctl for pausing at the desired offset. That would set the pause, but in addition, the application must be told when the pause happened (or if it happened without error), so that it can then query the user. Accordingly, CTL_SNYC, CTL_ALERT and CTL_GETEVENT ioctls have been implemented to tell the application what events occurred on or during the data stream.

In addition to the mandated CTL_START and CTL_STOP controls, the video control subsystem also supports CTL_SYNC, CTL_QUEUE, CTL_PAUSE, CTL_RESUME, CTL_SEEK, CTL_STAT, CTL_ALERT, CTL_FLUSH and CTL_GETEVENT. CTL_START provides the initial parameters necessary to start I/O, allocating all necessary buffers and creating any necessary threads. I/O doesn't proceed until a CTL_RESUME is issued and is initially paused. The parameter block passed in to the CTL_START control call includes the following fields: rate, bufsiz, nbufs, rside and wside, offset, length, dev_spec, and ds_len. The rate field can be used to pass in a bit rate to be used, as necessary, for rate limiting. Certain write-side devices are self pacing. Others will require software pacing. The bufsiz field describes the buffer size which should be used. The buffer size selected must be acceptable to both the producer of bytes and the consumer of bytes. EINVAL is returned in the case this is not so. The nbufs field indicates how many buffers should be used. The number must be within a predetermined range and EINVAL is returned in the case that this is not so. The rside and wside aggregates are parameters for the read side (byte producer) and write side (byte consumer), respectively. The offset field specifies an initial seek offset. The length field is used to describe the total transfer length in bytes. In the present example, it is an unsigned 64 bit value. If the requested length is "−1", the length is determined to be unknown. The dev_spec field points into the data area, at a device specific area, where read side and write side device specific parameters reside. The ds_len field indicates the length, in bytes, of the device specific area.

The CTL_STOP request causes all I/O to cease immediately, except that which has already been queued to the producer or consumer. No subsequent I/O requests will be issued. A CTL_SYNC call permits a thread to synchronize with pending operations. The calling thread will be put to sleep until the current pending operation completes, or I/O terminates, or another pending operation is received canceling the first. If there is no pending operation, control returns immediately. The following fields are included in a parameter block passed in to the CTL_SYNC control call. A which field indicates whether the operation to synchronize is on the read side or the write side. The value zero indicates read side and the value one indicates the write side in the present example. A both field indicates that the sync is for both sides. As long as either side has a pending operation, the caller is put to sleep until one or the other pending operation fires. If an operation is pending on only one side when the thread is suspended, and an operation is made pending on the other side, the new pending operation is not added to the scope of the sync call. Only those operations which are pending at the time the call is made will be synchronized. A pause field, when set, will cause the coupling to pause when the thread is resumed. The stats field, when set, will cause, on successful return, the vcs_sync data area to be overlaid with a vcs_stats structure containing a snapshot of the current statistics. The size of the two data structures differs, with the latter being the larger. The direct return of the statistics is provided in anticipation that the stats data will be often desired on return from a call to synchronize.

The CTL_QUEUE control call is used to queue the next portion to be used for either read side or write side. In the absence of errors, it returns immediately, but the operation remains pending. Any previous pending queue operation for the indicated side is cancelled. The which field indicates which side, either read side or write side, to which the operation refers. In addition, it indicates the side relative to which the whence value should be interpreted. The pause field, when set, indicates that when this operation fires, the coupling should pause. The whence field indicates the absolute byte offset, relative to the appropriate read side or write side, at which the operation should take place. A value of zero can be used to specify the immediate execution of the operation. A value of "−1" can be used to specify that the queue operation should take place once the end of the current file segment, as specified by the initial CTL_START parameters, or the most recently executed queue operation. If the value exceeds the current valid bounds for offsets, the operation fails with EIATVAL. The whither field will be used if the operation takes place as the initial offset. The u.fd field is interpreted as the process level file descriptor for the new file segment. This permits the replacement of the initially coupled file descriptors, and thus, upon successful execution of this call, the file descriptor is not longer available to the user process, as in the couple ( ) system call semantics. The length field is interpreted as the length in bytes of the new file segment. The bufsiz field, if non-zero, indicates that a new buffer size is to be used. Not all video control subsystem (VCS) based coupling services will permit the buffer size to be changed midstream. The ds_len field is interpreted as the length of any device specific portion which follows. The dev spec field is interpreted as the device specific data. On successful execution of CTL_QUEUE, any currently pending queue operation for the specified side is cancelled and the new queue operation becomes pending for this side. Once the current I/O offset for the specified side reaches or exceeds that specified by the whence field, the file associated with the current file segment is closed and I/O is directed to the new file segment, starting with the whither offset. Any pending operations (pause, seek etc.) are cancelled unless they activated at the same or earlier offset, in which case, they take precedence. The CTL_PAUSE control call takes arguments and the passed parameter block includes the following fields. The which field indicates which side, either read side or write side, to which the operation refers. In addition it indicates the side relative to which the whence value should be interpreted. The whence field indicates the absolute byte offset, relative to the appropriate read side or write side, at which the operation should take place. A value of zero can be used to specify the immediate execution of the operation. A value of "−1" can be used to specify that the pause operation should take place at the end of the current file segment. If the value exceeds the current valid bounds for offset, the operation fails with EINVAL. Any pending pause or seek control operation for this side (read side or write side) is cancelled and the operation becomes pending. Once the offset is met or exceeded, as measured when I/O is being requested, the operation fires, and the coupling is paused. While in a paused state, no further I/O is requested, but previously issued I/O requests may still be pending completion. Once paused, the current offset of the side as specified in the control request by the which field is set to the whither value. If the whither is specified as "−1", this will be used to indicate that the current offset is not to be changed. The flexibility is provided to pause either the read side or the write side. When the pause fires, both sides will pause, but the final internal state of the coupling will differ depending on which side to pause was issued.

The CTL_RESUME control call takes no parameter block as argument. It causes a paused coupling to immediately resume execution at the current offset. Any iobufs in process or "in the pipe", are passed to the write side, and any iobufs at rest are passed to the read side, at which time they become "in flight". In this manner, the coupling resumes running.

The CTL_SEEK control call, in the absence of errors, returns immediately and the operation remains pending. It takes as argument, data using the following fields. The which field indicates which side, read side or write side, to issue the seek on, and also which side to interpret the other parameters. The value zero indicates read side and the value one indicates the write side. The perm field indicates, if non-zero, that this seek should remain in effect after it becomes active. This permits continuous loop to be constructed, however, it is still subject to being cancelled by the issuance of another pending operation. The whence field indicates the absolute byte offset, relative to the appropriate side, which must be attained prior to the seek taking place. If this offset is already passed, the seek takes place as soon as the next I/O operation is processed, remaining pending until then. The whither field specifies the new offset to be used. Both offsets must lie within the bounds of the current file segment or EINVAL is returned. Any pending seek operation for this side (read side or write side) is cancelled and this operation becomes pending. When the whence offset is reached or exceeded, no further I/O requests are forwarded using the old offset, and whither becomes the current offset.

The CTL_STAT request takes a parameter block using the following fields and is used as an area to return statistics to the caller. The state field indicates the internal video control subsystem state at the time the statistics were obtained. This is mainly for informational and debug purposes. The rside and wside aggregates are one for each of the read side and the write side, respectively. The length field is the current file segment length. The whence field is the current offset at the time the operation executed. The total field is the count of all bytes successfully produced by the producer, in the case of the read side, or consumed by the consumer in the case of the write side. The error field reflects any I/O error, or other error, which occurred. Errors will cause the coupling to have ceased functioning. The eof field is set to non-zero when the end of file has been detected. Due to seek, pause and queue commands, which can change to offset, it is possible to reach end of file, and then seek or pause to a different offset, thereby clearing end of file. A new file segment queued will always clear eof. The pending aggregate reflects the currently pending operation. The pending.whence field is the offset at which the pending operation is set to activate. The pending.op field is the operation which is pending. This only reflects the VCR type operations, not any pending queue or pending alert. The fseq field is incremented once each time a pending CTL_QUEUE fires. Thus it is possible to determine directly that a pending queue has fired rather than having to keep track of the total bytes or rely on differing offsets.

The CTL_ALERT request takes a parameter block using the following fields. The which field indicates which side the operation refers to and which relative side to interpret the other fields. The whence field represents the offset at which the alert is desired. In the absence of errors, this call returns immediately, but the alert remains pending. Any pending alert for the indicated side is cancelled, and the new alert becomes pending. When the current offset meets or exceeds the value represented by the whence, any thread which is sleeping in a select ( ) system call for exception conditions on the control file descriptor will awaken and the select call will return indicating that there are exception conditions on this coupling. Also any previously issued CTL_SYNC will return.

The CTL_FLUSH control call, in the absence of errors, flushes all pending data from the read side to the write side. It takes as an argument the file descriptor returned from the couple ( ) call.

The CTL_GETEVENT request takes a parameter block using the following fields and is used as an area to return information on events which have occurred on the coupling to the caller. The which field indicates which side (read or write) to which the operation refers. The either field indicates that events from either side, read or write, will be returned. In this case, the which field is ignored. The more field indicates that multiple events are returned. The valid field indicates that the parameters represent a valid event. The whence field represents the file offset when the event occurred. The op field indicates which event occurred. The seq field is the sequence number of the event, and the tod is the time at which the event occurred.

It is possible to indirectly control the passage of data through the coupling. Additionally, it can be permitted that data can be read from and written to the coupled files. This may be deemed to be desirable in certain server products. The readx ( ) system call, when applied to a coupling which is either paused or running, causes the coupling to pause immediately. No further I/Os are issued. Any I/Os in flight to the producer will come to align in the pipe. Any I/Os in flight to the consumer will, when completed, become at rest. The first parameter is the coupling descriptor. The second parameter is the user space address of a buffer, wherein I/O references are returned upon success. The third parameter is the number of I/O references to be returned. This is not a byte count but rather the count of the maximum number of references to be returned. The fourth parameter peculiar to the "x" characteristic of these calls, must be ZC_REF. The off field is the read side offset of the first byte of data described by the ioref. This is in terms of the current file segment which the read side is processing. The len field is the count of the bytes of data associated with this ioref. When the readx ( ) call is issued, the smaller of the number of iorefs requested and the number of I/O buffers specified in the CTL_START parameters is determined. This is the maximum number of iorefs which will be returned. There may or may not be any iobufs in the pipe, but any at rest iobufs are pressed into service by issuing I/O requests to the read side, and as iobufs return from the write side, they also, up to the maximum, will be pressed into service to satisfy the request. The caller will block, if necessary, until sufficient iobufs have been presented to the producer and returned to alight in the pipe. During the issuance of I/O, any pending operations which become active on the read side will do so in the normal manner. Once sufficient iobufs are in the pipe, references to these I/O buffers are constructed, and copied out to the user supplied buffer, and the value returned will be the number of iorefs so provided. In the case of a protection violation or addressing error when accessing the user buffer, EFAULT will be returned. If the coupling is an incorrect state, i.e. neither paused nor running, EINVAL will be returned.

The ready system call, when applied to a coupling which is either paused or running, causes the coupling to pause immediately. No further I/Os are issued. Any I/Os in flight to the producer will come to alight in the pipe. Any I/Os in flight to the consumer, will, when completed, become at rest. The first parameter is the coupling descriptor. The second parameter is the user space address of a buffer wherein data bytes are returned upon success. The third parameter is the number of data bytes to be returned, i.e. the count of the maximum number of data bytes to be returned. The read call consumes bytes from iorefs which are in the pipe. Each ioref will be either totally consumed or not consumed. In order to consume an iobuf, it must be in the pipe. When no further iobufs are in the pipe additional idle iobufs are pressed into service as they become available to satisfy the request. While the request remains unsatisfied, and the residual count is sufficient to consume all the data from the oldest iobuf in the pipe, the iobuf is consumed and the data copied out to the buffer. The caller will block, if necessary, until sufficient data bytes have been returned, unless the control descriptor has been conditioned to be non-blocking. During the issuance of I/O, any pending operations which become active on the read side, will do so in the normal manner. In the case of a protection violation or addressing error when accessing the user buffer, EFAULT will be returned. If the coupling is in an incorrect state, i.e. neither paused not running, EINVAL will be returned.

The writex ( ) system call, when applied to a coupling which is paused, causes the iobufs associated with the indicated iorefs to be sent to the consumer. The first parameter is the coupling descriptor. The second parameter is the user space address of a buffer, ostensibly containing iorefs. The third parameter is the number of I/O references to be written, i.e. the count of the maximum number of references to be handled. The fourth parameter of the "x" calls is either the ZC_REF or ZC_REF | SC_MOD. There are two different variations of this call. If no modification to iorefs are desired, as indicated by the fourth parameter being ZC_REF, the number of iobufs specified will be presented to the consumer starting initially with those in the pipe. If there are insufficient iobufs in the pipe, idle iobufs are pressed into service and presented to the read side. As the read side produces full iobufs, they are asynchronously presented to the write side without roosting in the pipe. If modifications are desired, as indicated by the fourth parameter being ZC_REF | SC_MOD, the number of iorefs specified will be coupied in from the buffer. Each ioref so copied in must refer to an iobuf in the pipe. The off field for each ioref can be modified so as to skip bytes in the iobuf, with appropriate reduction in length. Also by just reducing the length, bytes can be stripped from the end of the data in the iobuf. EIAVAL is returned in the case that the off and len fields do not refer to data within the original iobuf. EINVAL is returned in the case that more iorefs are presented than exist in the pipe.

The write ( ) system call, when applied to a coupling which is paused, causes data from the caller's buffer to be injected to the consumer. The first parameter is the coupling descriptor. The second parameter is the user space address of a buffer wherein data bytes are sought. The third parameter is the number of data bytes to be transferred i.e. the count of the number of data bytes to be transferred. The write call doesn't affect iorefs which are in the pipe. Idle iorefs are pressed into service (and there will always be at least one ioref reserved for this purpose) to represent the user data buffer area to the consumer, subject to the consumer's minimum block size restrictions, if any. The caller will block if necessary, until all data bytes have been transferred, unless the control descriptor has been conditioned to be non-blocking. During the issuance of I/O, any pending operations will become active (on the write side) will do so in the normal manner. In the case of a protection violation or addressing error when accessing the user buffer, EFAULT will be returned. If the coupling is in an incorrect state, i.e. neither paused not running, EINVAL will be returned.

The select ( ) system call functions for coupling descriptors when selecting for exception conditions. Exception conditions include whenever a pending operation completes and whenever an alert point is reached. This function has essentially identical semantics as CTL_SYNC, but permits one thread to synchronize with many couplings in one blocking call.

The method and apparatus of the present invention has been described in connection with a preferred embodiment as disclosed herein. The disclosed design details a couple subsystem which is a kernel extension, plus a framework within which coupling modules can be written. Coupling modules adhering to the conventions of the disclosed framework can register themselves with the couple subsystem to provide coupling services. The coupling subsystem makes these services available at the application programming level by means of the introduction of a new system call. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The monitoring methodology may also be implemented solely in program code stored on a disk or diskette (portable or fixed), or other memory device, which may be loaded into a system from which it may be executed to operate as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for directly coupling first and second devices together in a computer environment, said first and second devices having first and second file types, respectively, associated therewith, said method comprising:

creating a data transfer requirement by an originating device;

recognizing said data transfer requirement for transferring data between said first and second devices;

getting file types for first and second devices;

creating a transfer service for said first and second devices, said service being based upon said file types for said first and second devices, and transferring data directly between said first device and said second device without intermediate buffering, said transfer being accomplished using said created transfer service.

2. The method as set forth in claim 1, and further including:

getting file descriptors for said first and second devices after said recognizing.

3. The method as set forth in claim 2 and further including:

returning a new file descriptor for said transfer service after said creating.

4. The method as set forth in claim 3 wherein said new file descriptor is based upon said file types for said first and second devices.

5. The method as set forth in claim 4, and further including:

closing said first and second file descriptors after said returning.

6. The method as set forth in claim 3, and further including:

closing said first and second file descriptors after said returning.

7. The method as set forth in claim 1 and further including:

returning a new file descriptor for said transfer service after said creating.

8. The method as set forth in claim 7 wherein said new file descriptor is based upon said file types for said first and second devices.

9. The method as set forth in claim 8, and further including:

closing said first and second file descriptors after said returning.

10. The method as set forth in claim 7, and further including:

closing said first and second file descriptors after said returning.

11. The method as set forth in claim 1 and further including:

recognizing a start request; and starting a data transfer operation in response to said start request.

12. The method as set forth in claim 1 and further including:

recognizing a stop request; and stopping a data transfer operation in response to said stop request.

13. The method as set forth in claim 1 and further including:

recognizing a synchronize request; and permitting a thread to synchronize with pending operations in response to said synchronize request.

14. The method as set forth in claim 1 and further including:

recognizing a queuing request; and queuing up a file to be transferred in response to said queuing request.

15. The method as set forth in claim 1 and further including:

recognizing a pause request; and effecting a pause in a program operation in response to said pause request.

16. The method as set forth in claim 1 and further including:

recognizing a resume request; and resuming a paused program operation in response to said resume request.

17. The method as set forth in claim 1 and further including:

recognizing a seek request; and seeking to a predetermined offset in response to said seek request.

18. The method as set forth in claim 1 and further including:

recognizing a statistics request; and providing program statistics in response to said statistics request.

19. The method as set forth in claim 1 and further including:

recognizing an alert request; and effecting a program alert condition for a predetermined offset in response to said alert request.

20. The method as set forth in claim 1 and further including:

recognizing a select request; and permitting one thread to synchronize with many couplings in one blocking call.

21. The method as set forth in claim 1 and further including:

recognizing a flush request; and flushing pending data from a read side to a write side in response to said flush request.

22. The method as set forth in claim 1 and further including:

recognizing a getevent request; and returning information regarding events which have occurred on a coupling to a caller.

23. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective to selectively cause said processing circuitry to directly couple first and second devices together, said first and second devices having first and second file types, respectively, associated therewith, said program signals being further effective to accomplish the steps of:

enabling a creating of a data transfer requirement between said first and second devices by an originating device;

recognizing said data transfer requirement for transferring data between said first and second devices;

getting file types for first and second devices;

creating a transfer service for said first and second devices, said service being based upon said file types for said first and second devices, and transferring data directly between said first device and said second device without intermediate buffering, said transfer being accomplished using said created transfer service.

24. The medium as set forth in claim 23, and further including:

getting file descriptors for said first and second devices after said recognizing.

* * * * *